United States Patent [19]
Whitmire

[11] Patent Number: 5,454,532
[45] Date of Patent: Oct. 3, 1995

[54] AIRCRAFT DEICER PUMPING SYSTEM

[75] Inventor: Thomas W. Whitmire, Winter Park, Fla.

[73] Assignee: FMC Corporation, Chicago, Ill.

[21] Appl. No.: 5,317

[22] Filed: Jan. 15, 1993

[51] Int. Cl.$^6$ .............................. B64D 1/00; B64D 15/00
[52] U.S. Cl. .................. 244/134 R; 244/134 B; 244/136; 417/80; 417/84; 417/89
[58] Field of Search ............... 244/134 R, 134 A, 244/134 B, 134 C, 136; 109/62, 13; 417/89, 76, 80, 84, 198; 137/339, 340, 341, 566

[56] References Cited

U.S. PATENT DOCUMENTS

| | | | |
|---|---|---|---|
| 2,270,911 | 1/1942 | Tinker | 417/89 |
| 3,630,051 | 12/1971 | Martin . | |
| 3,817,659 | 6/1974 | Erickson | 417/89 |
| 3,946,562 | 3/1976 | Ross | 137/115 |
| 3,987,628 | 10/1976 | Gassman | 417/87 |
| 4,037,991 | 7/1977 | Taylor | 417/89 |
| 4,197,712 | 4/1980 | Zwick et al. | 60/53 |
| 4,294,573 | 10/1981 | Erickson et al. | 417/89 |
| 4,381,175 | 4/1983 | Erickson et al. | 417/89 |
| 4,623,302 | 11/1986 | Zeh | 417/89 |
| 4,704,070 | 11/1987 | Iseman | 417/89 |
| 4,877,377 | 10/1989 | Taylor | 417/89 |
| 5,096,145 | 3/1992 | Phillips et al. | 244/134 R |
| 5,190,249 | 3/1993 | Whitmire et al. | 244/134 R |
| 5,282,590 | 2/1994 | Zwick | 244/134 C |

FOREIGN PATENT DOCUMENTS

| | | | |
|---|---|---|---|
| 0631685 | 11/1978 | U.S.S.R. | 417/89 |
| 1574829 | 9/1980 | United Kingdom | 417/89 |

*Primary Examiner*—Andres Kashnikow
*Assistant Examiner*—Virna Lissi Mojica
*Attorney, Agent, or Firm*—Henry C. Query, Jr.

[57] ABSTRACT

In an aircraft deicer comprising a reservoir and a pump connected to the reservoir through a first conduit, the pump operating to circulate a fluid contained within the reservoir throughout at least a portion of the deicer, the improvement comprising: a jet pump located in the first conduit between the reservoir and the pump for increasing the pressure of the fluid within the first conduit between the jet pump and the pump; the jet pump comprising a tubular body portion having an inlet end and a discharge end and a nozzle located within the body portion between the inlet end and the discharge end; and a second conduit extending from a discharge end of the pump to the nozzle; whereby fluid from the discharge end of the pump is injected into the fluid flowing from the reservoir through the jet pump.

3 Claims, 1 Drawing Sheet

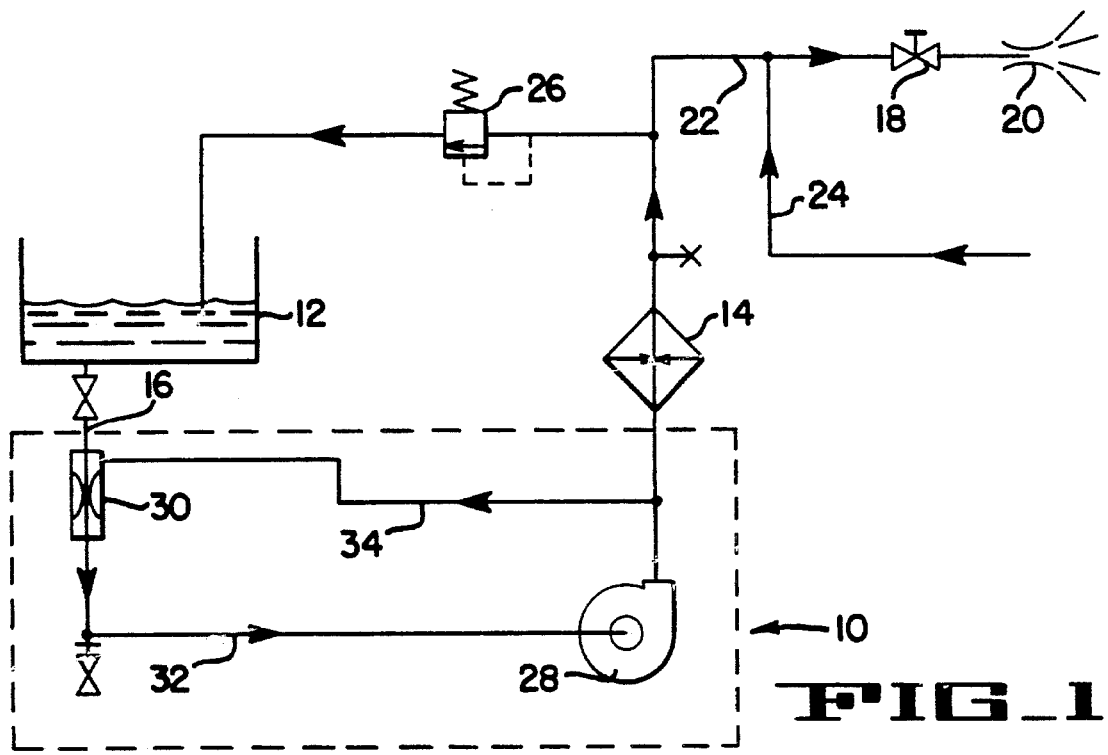
FIG_1
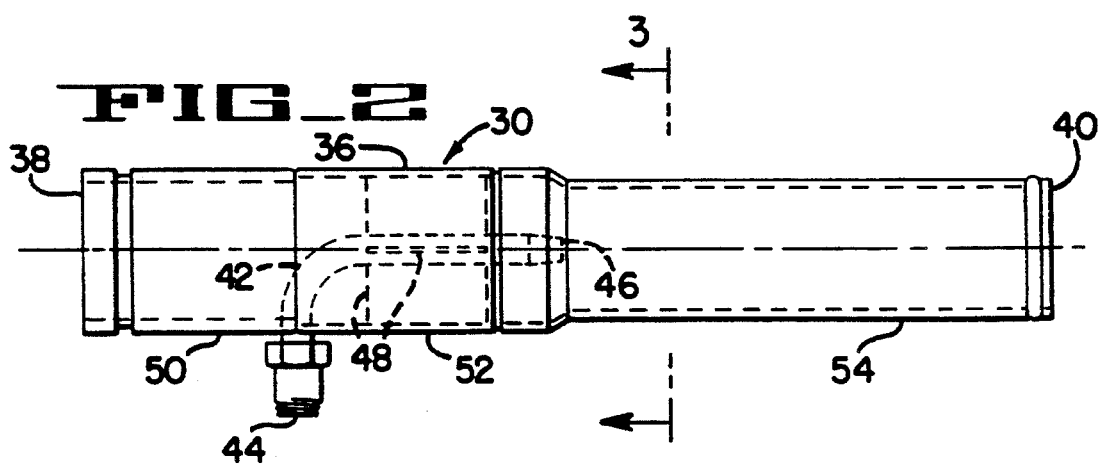
FIG_2
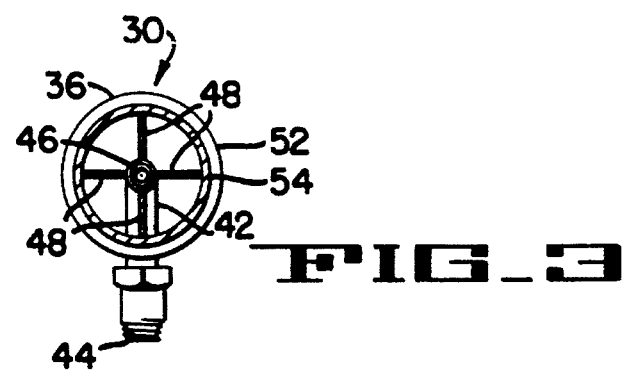
FIG_3

AIRCRAFT DEICER PUMPING SYSTEM

BACKGROUND OF THE INVENTION

1. Field of the Invention

This invention relates to aircraft deicing apparatus. More particularly, the invention relates to a pumping system for an aircraft deicer comprising a jet pump upstream of a primary pump. The jet pump operates to increase the pressure of the fluid upstream of the primary pump above the vapor pressure of the fluid to thereby prevent cavitation in the primary pump.

2. Description of Related Art

In typical aircraft deicers, water is mixed with an aircraft deicing fluid, such as a glycol-based solution, and the mixture is subsequently applied to an aircraft requiring deicing. Industry standards require that this mixture be heated to approximately 185 degrees Fahrenheit. In a proportioning system, the water and the aircraft deicing fluid are stored separately within the deicer and are mixed upstream of the delivery nozzle. Therefore, in such a system, the water and the aircraft deicing fluid must be heated to the required temperature prior to being mixed. However, it is desirable to maintain the temperature of propylene glycol-based, or Type II, aircraft deicing fluid below 165 degrees Fahrenheit to avoid degradation of the fluid during pumping and repeated reheating of the fluid. To do this and still deliver a mixture of water and Type II fluid at 185 degrees Fahrenheit, the water must be heated to 200 degrees Fahrenheit or greater. However, in typical deicer pumping systems the water is pumped at atmospheric pressure, and when the water is heated to 200 degrees Fahrenheit, the pressure of the water at the inlet to the primary pump may fall below the vapor pressure of the water, thus resulting in cavitation.

To eliminate this cavitation problem, prior art deicers have employed larger primary pumps which are better suited to handle cavitation, secondary boost pumps upstream of the primary pumps, pressurized water tanks, and/or worm screw inducers coupled to the primary pump shaft. However, these devices are expensive and space consuming. Therefore, the most convenient solution in prior art deicers is to limit the water temperature to around 185 degrees Fahrenheit and accept a less than desirable mixture temperature.

SUMMARY OF THE INVENTION

Therefore, it is an object of the present invention to provide a deicer pumping system which can prevent cavitation at the primary pump while delivering water at a temperature of 200 degrees Fahrenheit or greater. It is another object of the invention to provide such a pumping system which is relatively inexpensive and space efficient.

According to the present invention, these and other objects and advantages are achieved by providing a pumping system with a jet pump between the hot water reservoir and the primary pump. The jet pump is relatively small and inexpensive and is comprised of a body having an inlet end and a discharge end and a nozzle. The body is cast as one piece or constructed of tubing, and the portion within the tubing between the nozzle and the discharge defines the diffuser of the jet pump. A connection from the outlet of the primary pump to the nozzle of the jet pump directs high pressure water through the nozzle and into the diffuser at a high velocity. This jet of high velocity water creates a low pressure condition in the diffuser, which consequently draws a flow of water from the reservoir into the diffuser. This flow of water, travelling from the reservoir at a relatively low velocity, mixes with the jet of high velocity water in the diffuser to produce a combined flow having an intermediate velocity. The diffuser subsequently converts the energy of this intermediate flow of water into pressure at the discharge of the jet pump. Thus, the jet pump creates a higher pressure condition downstream of the jet pump and, therefore, at the inlet to the primary pump than normally would exist without the jet pump. The pressure actually achieved is well above the vapor pressure of the water and therefore prevents cavitation when the water is heated to 200 degrees Fahrenheit or more.

These and other objects and advantages of the present invention will be made apparent from the following detailed description, with reference to the accompanying drawings.

BRIEF DESCRIPTION OF THE DRAWINGS

FIG. 1 is a schematic representation of a portion of the fluid flow diagram of a deicer incorporating the pumping system of the present invention;

FIG. 2 is a side elevation view of the jet pump component of the pumping system of the present invention; and FIG. 3 is a sectional view of the jet pump taken along line 3—3 of FIG. 2.

DETAILED DESCRIPTION OF THE PREFERRED EMBODIMENT

Referring to FIG. 1, the deicer pumping system of the present invention, indicated generally by reference numeral 10, is shown incorporated into a fluid circuit for a typical aircraft deicer. A complete representation of the entire fluid circuit is not necessary to the understanding of the present invention. The pumping system described hereinafter can be incorporated into virtually any aircraft deicer comprising or connected to a fluid reservoir and requiring a primary pump to circulate the fluid through a heater and/or deliver the fluid under pressure to a nozzle for subsequent application to an aircraft requiring deicing, such as the deicer depicted and discussed in U.S. Pat. No. 5,096,145, assigned to the assignee of this invention.

In FIG. 1, deicer pumping system 10 is shown positioned in the deicer fluid circuit between a fluid reservoir 12 and a heater means 14. The fluid stored within reservoir 12 is typically water. Pumping system 10 draws water from reservoir 12 through a fluid conduit or section of pipe 16 at a particular rate, for example 100 gallons per minute. The water is then circulated by pumping system 10 through heater 14, wherein the water is heated to a desired temperature. As discussed above, this temperature is 200 degrees Fahrenheit or greater. A hand operated nozzle shut-off valve 18 controls the flow of the water through a nozzle 20. When it is desired to apply a mixture of heated water and aircraft deicer fluid to an aircraft, valve 18 is opened and the water is directed into a fluid delivery conduit 22, where it is mixed by appropriate means with an aircraft deicer fluid supplied through a line 24 from a reservoir (not shown). The mixture is then ejected through nozzle 20 and onto the aircraft. When valve 18 is closed, the water will circulate from heater 14 through a system relief valve 26 and back into reservoir 12. Consequently, the water contained within reservoir 12 is normally heated. The water will continue to circulate in this manner until valve 18 is again opened.

Referring still to FIG. 1, deicer pumping system 10 comprises a primary pumping means 28, such as a centrifugal pump, and a jet pump means 30, which is connected in series with and upstream of pump 28. Water from reservoir 12 enters jet pump 30 through pipe 16 and from there is directed through a length of conduit or pipe 32 to primary pump 28. A small portion of the water exiting primary pump 28, for example one fifth of the outflow, is directed through a section of conduit or pipe 34 back to jet pump 30, in a manner that will be described.

Referring to FIGS. 2 and 3, jet pump 30 comprises a tubular body portion 36 having an inlet end 38, which is connected to pipe 16 by welding or any other appropriate means, and a discharge end 40, which is connected to pipe 32 in a similar fashion. The diameter of body portion 36 is approximately the same as the diameters of pipes 16 and 32. Jet pump 30 also comprises a nozzle means 42 inserted into body portion 36 between inlet 38 and discharge 40. Nozzle 42 is preferably constructed from a section of metal tubing, such as stainless steel, and comprises an inlet end 44, which is connected to pipe 34 by welding or any appropriate means, and an outlet 46. The diameter of nozzle 42 is preferably selected to be smaller than the diameter of pipe 34. Furthermore, nozzle 42 is bent approximately ninety degrees so that outlet 46 is aligned with the longitudinal axis of body portion 36. To assure that nozzle 42 maintains its position within body portion 36, a number of fins 48 are positioned between nozzle 42 and the inside diameter of body portion 36. These fins can be welded to nozzle 42 to ensure their firm attachment thereto.

To simplify the manufacture of jet pump 30, body portion 36 is preferably constructed of three sections of pipe, 50, 52 and 54, which are welded together. The inside diameter of section 52 is slightly greater than the inside diameter of section 50 so that the velocity of the water flowing into jet pump 30 from pipe 16 will not decrease significantly upon encountering nozzle 42 in its path. In addition, semicircular holes are formed in the abutting ends of sections 50 and 52 to form an annular opening through which nozzle 42 extends when jet pump 30 is assembled. The inside diameter of section 54 is slightly smaller than the inside diameter of section 52 and consequently forms the diffuser portion of jet pump 30.

In operation, primary pump 28 draws heated water at approximately atmospheric pressure from reservoir 12 at a preselected rate, such as the aforementioned 100 gallons per minute. The water is drawn through jet pump 30 and pipe 32 and into primary pump 28. From there the water is circulated through heater means 14 at the preselected rate and then either back into reservoir 12 or into conduit 22, depending on whether valve 18 is open or closed. A small portion of the pressurized water exiting primary pump 28, however, is pumped through pipe 34 back to jet pump 30, where it is introduced through nozzle 42 into the flow of water entering jet pump 30 from reservoir 12. The exact portion of water actually delivered through nozzle 42 depends on the diameters of pipe 34 and nozzle 42 and the pressure available from primary pump 28. Because of the relatively small diameter of nozzle 42, the flow of pressurized water exiting nozzle 42 has a velocity much greater than the velocity of the water entering jet pump 30 through inlet 38. This jet of high velocity water creates a low pressure condition in the diffuser 54, which in turn serves to draw the water into inlet 38. The high velocity water discharging from nozzle 42 mixes with the lower velocity water entering jet pump 30 through inlet 38 to produce a combined flow of water having an intermediate velocity. The diffuser 54 functions in a known manner to convert the energy of this combined flow into a pressure at discharge end 40 of jet pump 30 which is greater than the pressure of the water prior to entering pumping system 10. This increased pressure is maintained in pipe 32 and is sufficiently greater than the vapor pressure of the water so as to prevent cavitation in primary pump 28.

It should be recognized that, while the present invention has been described in relation to the preferred embodiment thereof, those skilled in the art may develop a wide variation of structural details without departing from the principles of the invention. Therefore, the appended claims are to be construed to cover all equivalents falling within the true scope and spirit of the invention.

What is claimed is:

1. In an aircraft deicer comprising a reservoir and a pump connected to the reservoir through a first conduit, the pump operating to circulate a fluid contained within the reservoir throughout at least a portion of the deicer, the improvement comprising:

a jet pump means located in the first conduit between the reservoir and the pump for increasing the pressure of the fluid within the first conduit between the jet pump means and the pump;

the jet pump means comprising a tubular body portion having an inlet end and a discharge end and a nozzle located within the body portion between the inlet end and the discharge end; and a second conduit extending from a discharge end of the pump to the nozzle;

whereby fluid from the discharge end of the pump is injected into the fluid flowing from the reservoir through the jet pump means.

2. The improvement of claim 1, wherein the nozzle comprises a tube having an inlet and an outlet and the tube is bent approximately ninety degrees between the inlet and the outlet so that the outlet is substantially aligned with the longitudinal axis of the jet pump means.

3. The improvement of claim 2, wherein the jet pump means further comprises a plurality of fin means positioned between the nozzle and the body portion for maintaining the outlet in alignment with the longitudinal axis of the jet pump means.

* * * * *